United States Patent Office 3,103,989
Patented Sept. 17, 1963

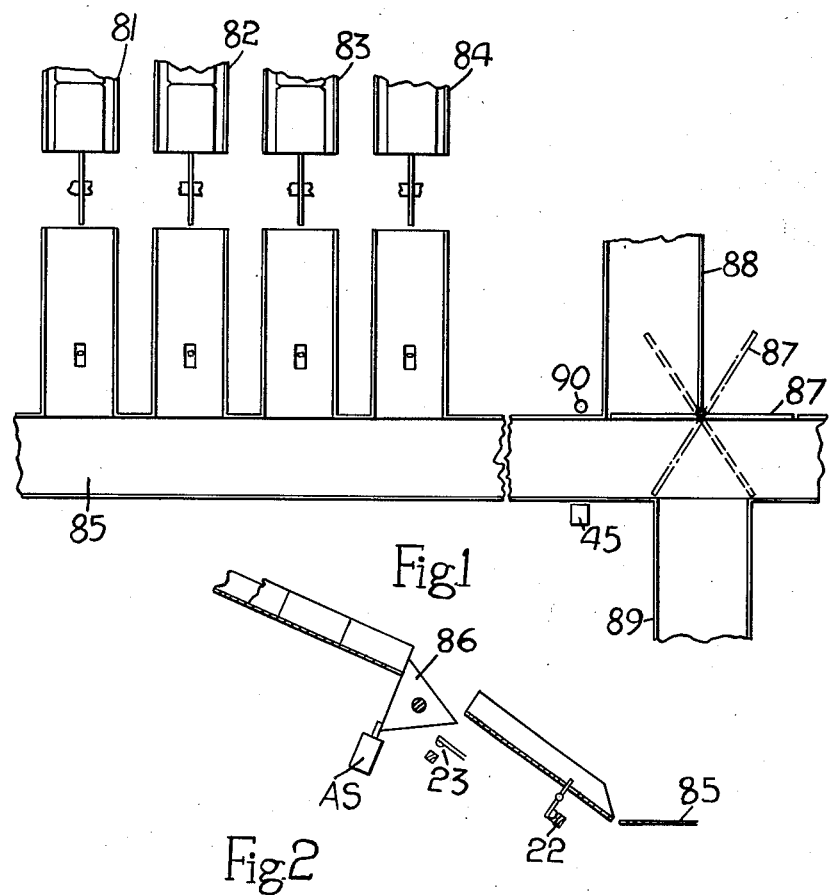

3,103,989
APPARATUS FOR DISPENSING PACKAGED GOODS
Thomas Felix Bunzl, London, England, assignor to Rotax Limited, London, England
Filed Apr. 2, 1962, Ser. No. 184,449
Claims priority, application Great Britain Apr. 11, 1961
12 Claims. (Cl. 186—1)

The object of this invention is to provide in a convenient form apparatus for dispensing an order consisting of predetermined quantities of a number of packages containing different goods to a predetermined station.

Figure 3:
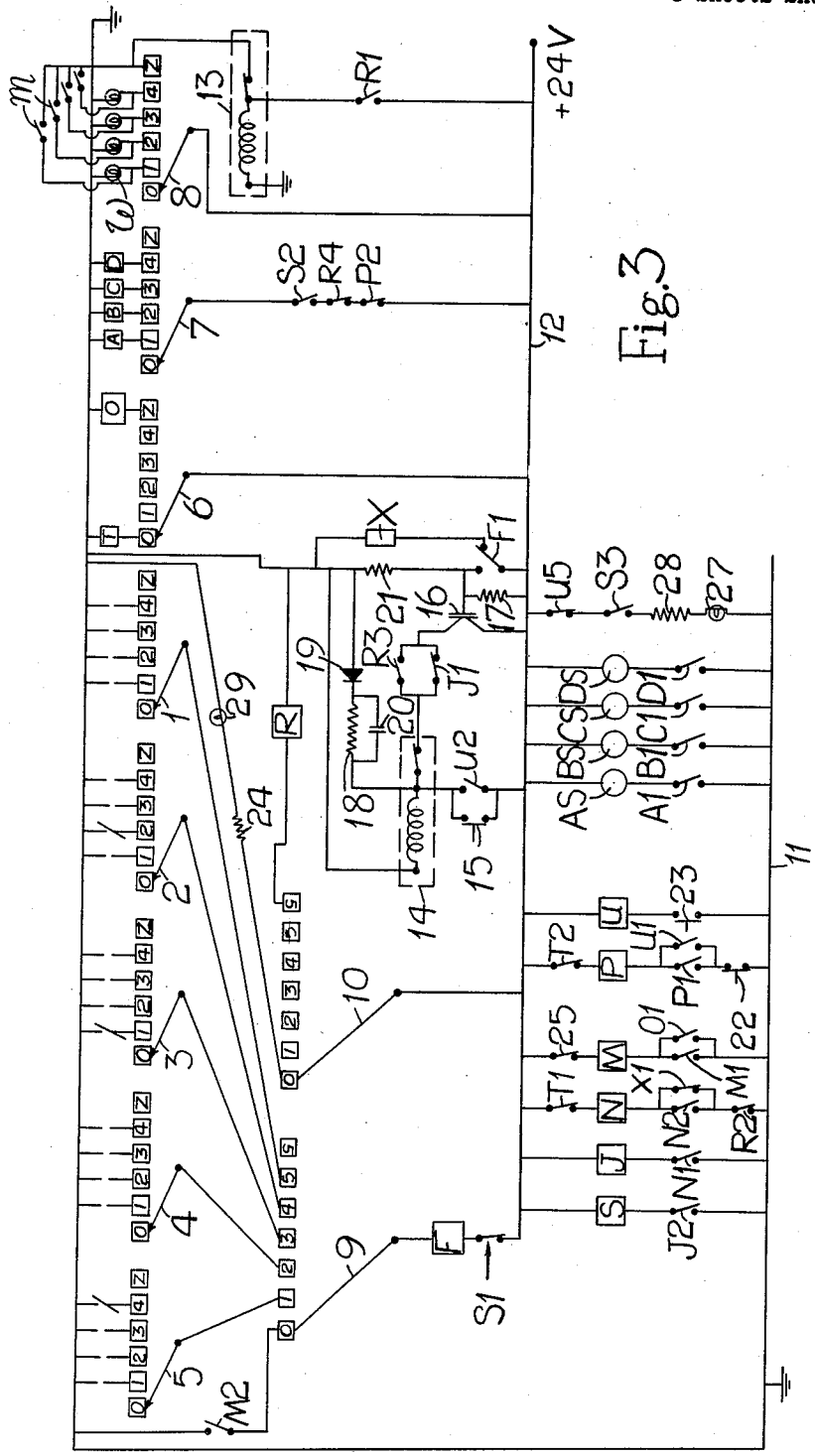
Figure 4:
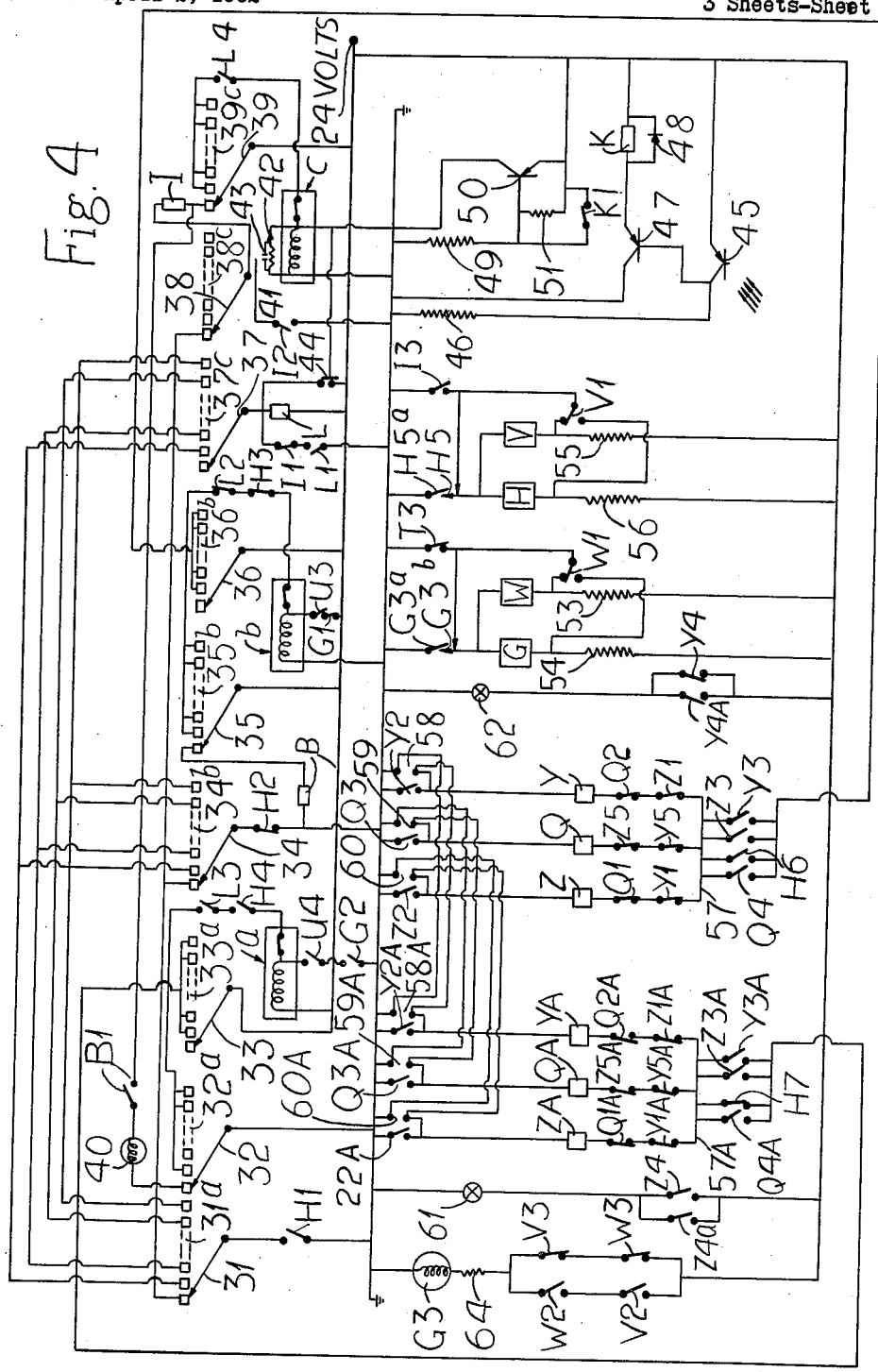

An example of the invention is illustrated in the accompanying drawings, in which FIGURE 1 is a diagrammatic plan view illustrating part of the apparatus, FIGURE 2 is a sectional view through one of the chutes seen in FIGURE 1, and FIGURES 3 and 4 are circuit diagrams.

Referring first to FIGURES 1 and 2, the apparatus includes four inclined chutes 81, 82, 83, 84 from which goods can be delivered onto a conveyor 85. The goods are normally held in the chutes by four rotatable members respectively, one of which is shown at 86 in FIGURE 2. The members 86 are normally held against rotation by solenoids such as As, and it will be appreciated that if the solenoid As is energised momentarily, the member 86 will move angularly through 120° and deliver one package to the conveyor 85.

The goods move along the conveyor 85 until they reach a gate 87. Depending on the position of this gate, the goods can then continue along the conveyor 85 or be transferred to one of the conveyors 88, 89.

The operation of the apparatus can be considered in two parts, the delivery of an order (i.e. predetermined numbers of the goods in the four chutes) onto the conveyor 85, and the delivery of an order to one of the three stations to which the conveyors 85, 88, 89 lead.

Delivery of an Order to the Conveyor

The apparatus shown in FIGURE 3 is designed to dispense up to five packages from each of the chutes 81, 82, 83, 84 in accordance with a reading on a punched card. For this purpose there is provided a uniselector 13, the term uniselector being used throughout this specification to denote a selector switch which is movable intermittently to wipe a plurality of annularly arranged contacts. The particular form of uniselector employed in this application comprises a solenoid and a switch in series. The switch is closed when the solenoid is de-energised, but is connected to the armature of the solenoid so as to be opened on energisation of the solenoid, thus if the circuit is closed the uniselector will drive continuously. It will be appreciated that the uniselector could equally well be operated by a succession of pulses.

The uniselector 13 includes wipers 1 to 5 each movable simultaneously over a series of contacts 0, 1, 2, 3, 4, Z. The contacts 1 to 4 of each series are normally connected to an earthed line 11 of a 24 volt source of supply which further includes a line 12, but the circuit from those contacts to the line 11 can be broken by a punched card inserted in the apparatus. The uniselector 13 includes further wipers 6, 7, 8, the wiper 6 being connected to the line 11 through relays T, O respectively when it is on the 0 and Z contacts, and the wiper 7 being connected to the line 11 through relays A, B, C, D, when it is on contacts 1, 2, 3, 4, respectively. Further, contact Z of the wiper 8 is connected through the switch and solenoid coil of the uniselector 13 to the line 11, whilst a point intermediate the uniselector solenoid coil and switch is connected to the line 12 through a normally open contact R1 of a relay R. The contacts 1 to 4 of wiper 8 are connected to the line 11 through warning lamps W respectively, and to the contact Z through normally-open manually-operable switches m for a purpose to be described.

There is further provided a second uniselector 14 having wipers 9, 10 movable over contacts 0, 1, 2, 3, 4, 5, g. Contacts 1 to 5 of the wiper 9 are connected to wipers 5, 4, 3, 2, 1, respectively, contact 0 of this wiper is connected to the line 11 through a normally open contact M2 of a relay M, whilst contacts 0 and g of the wiper 10 are connected to the line 11 respectively through a resistor 24, a lamp 29, and the relay R. Further, the wiper 10 is connected directly to the line 12, and the wiper 9 is connected to the line 12 through a relay F and a normally closed contact S1 of a relay S.

The end of the solenoid coil of the uniselector 14 remote from the switch is connected to the line 11, whilst a point intermediate the coil and switch is connected to the line 11 through a resistor 18 and a diode 19, the resistor 18 being bridged by a capacitor 20. The components 18, 19, 20 serve to absorb high voltage peaks across a transistor 16 (to be described). This point is also connected to the line 12 through a normally open contact U2 of a relay U, this contact being bridged by a normally open manually operable switch 15. Furthermore, the switch in the uniselector 14 is connected to the collector terminal of the transistor 16 through parallel paths containing respectively a normally open contact R3 of the relay R and a normally closed contact J1 of a relay J. The emitter terminal of the transistor 16 is connected to the line 12 whilst its base terminal is connected to the lines 11, 12 through resistors 21, 17 respectively. Moreover, the relay F includes a contact F1 which normally serves to energise a relay X but is movable by the relay F to a position in which it connects the base terminal of the transistor to the line 12.

Connected in parallel between the lines 11, 12 are a plurality of relays S, J, N, M, P, U. The relays S, J are connected to the line 11 through normally open relay contacts J2, N1 respectively. Moreover, the connection from relay N to line 12 is through normally closed contacts T1, whilst the connection from relay N to line 11 is through normally closed contacts X1, R2 and normally open contacts N2 bridging the contacts X1. Relay M is connected to the line 12 through a normally closed switch 25, and to line 11 through normally open contacts O1, M1 in parallel. The relay P is connected to the line 11 through normally open contacts U1, and a normally closed switch 22 (also shown in FIGURE 2). The contacts U1 are bridged by normally open contacts P1. Relay P is further connected to line 12 through normally closed contacts T2, and relay U is connected to line 11 through a normally open switch 23, which is also shown in FIGURE 2.

There are further connected between the lines 11, 12 four circuits containing respectively normally open contacts A1, B1, C1, D1 and solenoids As, Bs, Cs, Ds, these solenoids serving when energised to operate the members 86 in the four chutes respectively. Finally, connected between lines 11, 12 are a lamp 27, a resistor 28, a normally open contact 53, and a normally closed contact U5.

In order to facilitate understanding of the operation of this part of the apparatus, it will be assumed that the number of packages required from the chutes 81, 82, 83, 84 is 3, 2, 0, 5 respectively. An appropriately punched card is inserted in the apparatus, and serves to separate from the earthed line 11 all the contacts of the uniselector 13 other than those shown closed.

Initially, assuming the apparatus has not previously been in use, the various components are in the condition shown in the diagram, with none of the relays energised. On connecting the apparatus to the source of power the relay X is energised and the transistor 16 conducts so that the uniselector 14 begins to operate step by step. When the wipers 9, 10 reach contact g the relay R will be energised, and the consequent closing of contacts R1 will operate the uniselector 13 to move wipers 1 to 8 from contact 0 to contact 1. Wipers 9, 10 now move back to contact 0 so that the relay R is de-energised, and the uniselector 13 does not operate again until wiper 10 again reaches contact g. The uniselector 14 continues to operate until wiper 9 reaches contact 3, when a circuit is completed through wiper 3 to the line 11. The relay F is thus energised, and its contact F1 moves to its alternative position in which the transistor 16 is rendered non-conductive to stop operation of the uniselector 14, and the relay X is de-energised. De-energisation of relay X causes closing of contacts X1 and actuation of the hold-on relay N. Relay N serves in turn to effect energisation of relays J, S by the successive closing of contacts N1, J2. Furthermore, energisation of relay J causes opening of contacts J1, thereby preventing further operation of uniselector 14 when relay F is de-energised by opening of contacts S1. Energisation of relay S also closes contacts S2 to energise relay A and operate the solenoid As, which controls the member 86 associated with the chute 81.

Energisation of the solenoid As permits the member 86 to move angularly under the action of a package bearing against it, and when the member has rotated through 30° it closes the switch 23 momentarily to energise the relay U, which in turn causes operation of the self hold relay P. Energisation of the relay P opens contacts P2 to de-energise the relay A and the solenoid As, so that the member can only rotate through a further 90°, this being sufficient to allow the delivery of one package from the chute 81. Further, the momentary energisation of relay U causes closing of contacts U2 to move the wipers 9, 10 onto contacts 4.

On the completion of about 120° movement of the member 86, the package slides onto the conveyor 85 via the lower chute and in so doing opens switch 22 to de-energise relay P and re-energise relay A. A second package is now delivered in the manner described above, after which wipers 9, 10 move to contacts 5. A third package is then delivered and wipers 9, 10 are moved to contacts g. Relay R is now energised, and the subsequential opening of contacts R2 causes de-energisation of relays N, J and S. Furthermore, contacts R4 are opened so that the relay A remains de-energised when the switch 22 is opened, contacts R1 are closed to move wipers 1 to 8 onto contacts 2, and contacts R3 are closed to recommence operation of the uniselector 14. The latter now continues to operate until wiper 9 reaches contact 4, when the uniselector 14 is stopped and two packages are delivered from the chute 82. Similarly, no packages will be delivered from the chute 83, but five will be delivered from the chute 84.

In the event of a chute being empty the apparatus will stop, since relay U is not energised by closing of the switch 23. The apparatus can be restarted by operating switch 15 a number of times equal to the number of packages required from the empty chute. The lamp 27 will give an indication that a chute is empty, and one of the lamps w will be illuminated to indicate the chute. If the chute cannot readily be refilled it can be by-passed in subsequent operations by closing the appropriate switch m.

When the apparatus has read one punched card it is automatically returned to the zero position, since when wiper 6 is on contact Z it energises a relay O, which in turn operates a hold-on-relay M to close contacts M2. Hence when wiper 9 reaches contact 0, relay F is energised to cut-off the transistor 16 and stop uniselector 14. Uniselector 13 continues to operate by virtue of its connection to the contact Z of wiper 8, but ceases to operate when wipers 1 to 8 reach contact zero. Re-energisation of relays N and P is prevented by the contacts of relay T, and illumination of the lamp 29 gives an indication that the apparatus has been re-set. When the apparatus has stopped the punched card is exchanged for a further card, and recommencement of the apparatus is effected either by momentarily cutting off the supply, or by operating the switch 25, the relay M being de-energised in either case.

In a modification (not shown) the apparatus may be used to control eight chutes. For this purpose four further solenoids are provided and one connected in parallel with the solenoids As, Bs, Cs, Ds, respectively, so as to be under the control of the switches A1, B1, C1, D1. Moreover, the two groups of four solenoids are connected to the line 12 through a pair of normally open switches respectively, one of which is closed by the punched card to determine which set of four solenoids is being used. More chutes can be controlled by building up the apparatus in this way.

In a further modification of this part of the apparatus, the required order is set up in code form by manually operable switches in lieu of a punched card. Thus, in the example described there would be five switches for each chute, corresponding to the delivery of from one to five packages respectively, and to obtain the order described the three appropriate switches would be closed.

It will be understood that the apparatus may be extended to more than four chutes and that more than five packages may be delivered from a chute. Where larger numbers can be delivered it may be inconvenient to provide one hole or one switch for each number of packages required. In this case combinations of holes or switches could be used. Thus, for example, with five switches or holes it would be possible to provide a circuit allowing for the delivery of up to 31 packages depending on the setting of the switches or the positions of the holes.

*Delivery of an Order to a Station*

Each order can be delivered to one of three stations in accordance with a reading on the punched card which controlled the delivery of the order. The gate 87 is normally urged to the position shown in full lines in FIGURE 1 but is movable to the pair of alternative positions shown, in which an order is delivered to the other stations respectively, by a pair of gate-operating solenoids 61, 62 which are not shown in FIGURE 1.

Referring now to FIGURE 4, there are provided three uniselectors a, b, c. The uniselector a includes three wipers 31, 32, 33 movable respectively over banks of contacts 31a, 32a, 33a. The wiper 31 is connected to earth through a normally open contact H1 of a relay H, whilst the wipers 32, 33 are connected respectively to earth and to a 24-volt supply line. Further, all but the first of the contacts 32a are connected to the switch of the uniselector a through normally open contacts L3, H4, whilst a point intermediate the switch and solenoid is connected to earth through normally open contacts U4 and G2, the contacts U4 being operable by the relay U in FIGURE 3.

The uniselector b includes three wipers 34, 35, 36 movable respectively over banks of contacts 34b, 35b, 36b. The wiper 34 is connected through a normally closed contact H2 both to earth and, through a relay B, to the first contact of the bank 35b. The wipers 35, 36 are connected to the supply line, whilst all but the first of the contacts 35b are connected to the switch of the uniselector b through a normally open contact L2 and a normally closed contact H3. Further, a point intermediate the switch and solenoid of uniselector b is connected to the supply line through a normally open contact U3 and a normally closed contact G1.

The uniselector c includes three wipers 37, 38, 39 movable respectively over banks of contacts 37c, 38c, 39c. The wiper 37 is connected to the supply line through a relay L, and is also connected to earth through a normally open contact L1 and a normally closed contact I1. The wiper 38 is connected through a relay I to the first contact of the bank 39c, and in addition is connected to earth through a normally open contact I2. The wiper 39 is connected to the supply line.

The contacts in the bank 37c with the exception of the first are connected to the respective contacts in each of the banks 31a, 34b. The first contact on the bank 38c is connected to the first contacts in the banks 31a, 34b. Further, the first contact in the bank 39c is connected through a normally open contact B1 and a lamp 40 to the first contact of the bank 32a. The contacts of the bank 39c apart from the first are connected to the switch of uniselector c through a normally open contact L4. The solenoid of uniselector c is bridged by a resistor 41 and diode 42 in series, the resistor 41 being bridged by a capacitor 43. Moreover, a point intermediate the solenoid and switch of uniselector c is connected to the supply line through a switch 44 bridging the relay L.

There is also provided a photo-transistor 45 and associated light source 90 (FIGURE 1) which are located adjacent the gate at opposite sides of the conveyor 85 so that an article passing through the gate will interrupt light falling on the photo-transistor 45. The latter has its collector terminal connected through a resistor 46 to earth and in addition to the base terminal of a transistor 47 having its collector terminal connected to earth and its emitter terminal connected to the supply line through a relay K bridged by a diode 48. The relay K has a normally open contact K1 connected in series with a resistor 49 between the supply line and earth, a point intermediate the resistor and contact being connected to the base terminal of a transistor 50 and, through a resistor 51, to the supply line. Further, the emitter and collector terminals of the transistor 50 are connected respectively to the supply line and to a point intermediate the solenoid and switch of the uniselector c.

Connected between the supply line and earth is a circuit which will hereinafter be termed the "W-G circuit." This circuit comprises a pair of relays W, G connected to the supply line through resistors 53, 54 respectively, points intermediate the resistors and relays being connected to the terminal piece of a two-position contact W1 connected to earth through a normally open contact T3 operable by the relay T in FIGURE 3. The relays W, G are also connected to earth through a normally open contact G3a of the kind which when open or closed serves to close or open a subsidiary contact G3b, the latter being connected to earth through the contact T3.

An exactly similar circuit, which will hereinafter be termed the V-H circuit, is connected between the supply line and earth, the components 53, 54, W, G, W1, G3, T3 being replaced respectively by 55, 56, V, H, V1, H5, 13.

All but the first contact of the bank 36b are connected to a line 57 through parallel paths containing respectively normally open contacts Y3, Z3, H6 and Q4. The line 57 is connected to earth through three parallel paths, the first of which contains normally closed contacts Z1, Q2, a relay Y and a normally open contact Y2. The second contains normally closed contacts Y5, Z5, a relay Q and a normally open contact Q3, whilst the third contains normally closed contacts Y1, Q1, a relay Z and a normally open contact Z2. Further, the contacts Y2, Q3, Z2 respectively are bridge by pairs of terminals 58, 59, 60 which normally will be closed but are separated by the punched card unless a hole is punched in the card at the appropriate place. It will be appreciated that the punched card referred to is the same card described with reference to FIGURE 3.

All but the first of the contacts of bank 33a are connected in a circuit similar to that described in the preceding paragraph. The components of the circuit are similar to those just described and have been indicated by like references with the suffix A. An exception, however, is that a normally closed contact H7 is equivalent to the normally open contact H6, and the terminals 58A, 59A, 60A are fixed terminals which are not separated by the punched card, but are connected respectively to the terminals 58, 59, 60.

The gate-operating solenoids are indicated at 61 and 62, the solenoid 61 being connected between earth and the supply line through normally open contacts Z4, Z4A in parallel, and the solenoid 62 being similarly connected through contacts Y4, Y4A in parallel. Finally, a lamp 63 and resistor 64 in series are connected to earth and also to the supply line through parallel paths one of which contains normally closed and open contacts V2, W2, and the other of which contains similar normally closed contacts W3, V3.

Before describing the general operation of the apparatus it will be convenient to explain the operation of the W-G circuit. Assuming that the contacts are in the position illustrated with both relays W, G de-energised, then upon closing contact T3 the relay G is energised to close contact G3a and open contact G3b. Relay W is short-circuited through contact T3, and hence is not energised. However, upon opening contact T3, relay W is energised and contact W1 moves to its alternative position. The next time the contact T3 is closed, the relay G will be de-energised but relay W will remain energised until contact T3 is again re-opened. Thus successive operations of the contact T3 cause the relay G to be alternately energised and de-energised. The V-H circuit operates in similar fashion upon successive actuations of the contact 13.

Reverting now to the general operations of the apparatus, assume that all the relays and contacts are in the state illustrated and that a punched card representing what will be termed a first order is inserted into the apparatus, it being desired to convey the order to the station corresponding to the position of the gate when the solenoid 62 is energised. The other positions of the gate correspond to energisation of the solenoid 61, and to energisation of neither solenoid, when the gate returns to a neutral position under spring action. Initially the punched card serves to separate the contacts 59, 60 but a hole is punched in the card so that contacts 58 (and hence contacts 58A) are closed. However, at this stage there is no circuit completed through the contacts 58 or 58A.

The apparatus described with reference to FIGURE 3 delivers packages singly onto the conveyer 85, and each time a package is delivered the relay U is energised, thereby closing contacts U3, U4. Closing of contact U4 will have no effect, since contact G2 is open, but closing of contact U3 will cause the uniselector b to step once. In this way, uniselector b will count the number of articles which have been delivered onto the conveyor 85 in the first order and will stop when the first order is completed. However, as soon as the uniselector b commences to count, a circuit is completed through wiper 36, contact H6, relay Y and terminal 58 to earth. Relay Y is then energised to close the hold-on contacts Y2, Y3, to open contacts Y1, Y5 so that there is no possibility of either of relays Q, Z becoming energised, and to close contact Y4 so that the solenoid 62 is energised and the gate is moved to the desired position. It will be appreciated that by virtue of the contacts Y2, Y3, the solenoid 62 will remain energised, even if the punched card is removed and contact H7 is opened, until the wiper 36 is returned to its zero position.

When the first order is completed, the relay T in the FIGURE 3 is energised and hence causes contact T3 to close and thereby operate the W-G circuit in the manner previously described. Energisation of relay G opens contact G1, so that no further count can be made into uniselector b, and closes contact G2 so that a second order can now be counted into uniselector a. Let us assume that this second order is to be conveyed to that station corresponding to energisation of the solenoid 61, then the second punched card is arranged to separate terminals 58, 59 but to leave terminals 60 in contact. However, even when the uniselector *a* commences to count, no circuit is completed through the contacts 60.

Whilst the goods in the second order are being counted into uniselector *a*, the first order will be passing through the gate. As each package passes through the gate it interrupts light falling on the photo-transistor 45, thereby biasing the transistor 47 in a manner to render it conductive so that relay K is energised. Energisation of relay K serves to close contact K1 so that the transistor 50 becomes conductive and thereby steps the uniselector *c* once. It will thus be appreciated that the number of packages passing through the gate are counted into the uniselector *c*. The purpose of the components 41, 42, 43 is to conduct any back E.M.F. appearing in the solenoid of the uniselector *c* and which might otherwise damage the transistor 50.

When the first order has been passed through the gate the wiper 37 is connected to the wipers 31, 34. Since contact H2 is closed, a circuit is completed through wipers 34, 37 to energise relay L, which is thereafter maintained energised by its hold-on contact L1 until contact I1 is opened. Energisation of relay L also closes contact L3, which has no effect since contact H4 is open. In addition, however, contacts L2, L4 are closed so that the uniselectors *b, c* are stepped continuously back to their zero positions, at which point they are stopped since the circuits through wipers 35, 39 respectively are broken.

When both uniselectors *b, c* are re-set relay I is energised to operate hold-on contact I2, to open contact I1 and thereby de-energise relay L, and to operate the V–H circuit and change over all the H contacts. The uniselector *b* is now ready to count a third order once the second order has been completed so that relay G has been de-energised. Further, uniselector *c* is now ready to count the second order as it passes through the gate. It will be appreciated that as soon as uniselector *c* steps once the relay I will be de-energised.

When, in the operational sequence described above, the wiper 36 reaches its zero position, the relay Y is de-energised and returns to its neutral position under spring action. At this stage the punched card corresponding to the second order is still in position and the terminals 60 are closed. Hence, when energisation of the relay I causes switching of the V–H circuit, contact H6 is closed and relay Z is energised to operate solenoid 61 in a manner similar to that already described with reference to solenoid 62. The punched card can now be removed and a third order can be counted into uniselector *b* while the second order is passing through the gate.

When starting the apparatus it is essential that the uniselector *c* and at least one of the uniselectors *a, b* is reset. In order to give an indication that this is so the relay B is included. It will be appreciated that the lamp 40 will be illuminated only when all three uniselectors are re-set. In addition it is essential that both relays H, G are either energised or de-energised. For this purpose the lamp 63 is included. This lamp is illuminated only when the condition of relays H, G is correct. Hence on commencement both lamps 40, 63 must be illuminated. If they are not, the apparatus can be set manually, by pulses applied by way of the switch 44.

With the apparatus thus far described, a third order cannot be counted into a uniselector until the first order has passed through the gate, since it is essential that the second punched card remain in the apparatus until the first order has passed through the gate, so that the gate can be properly reset. However, the invention can be extended to use more than two uniselectors such as *a* and *b*. Where, for example three uniselectors are used in addition to the uniselector *c* then modifications are necessary to the W–G and V–H circuits. Considering the W–G circuit, the relay G is made to operate an exactly similar circuit W1–G1 by means of a contact G1 in the similar circuit, and by providing G, G1 with suitable changeover contacts it is possible to obtain four circuits which are successively energised upon successive actuations of contact T3. If only three circuits are required, energisation of the fourth circuit is made to close contact T3 thereby reverting the system to its initial state. If three circuits are required and three uniselectors are used, the contacts H6, H7 are replaced by normally open and closed contacts G4, G5 respectively. In addition normally closed and open contacts H7, H8 are included in series with contacts Y4, Y4A respectively, and normally open and closed contacts H9, H10 are included in series with contacts Z4A, Z4 respectively. Now suppose that relay YA is energised, then when a second punched card is inserted into the apparatus one of relays Y, Z, Q will be energised, and will remain energised when the card is removed. However, this relay will not become effective until the H-contacts change over. Thus at this stage a third card can be inserted into the apparatus, so that there may be a first order passing through the gate, a second order on the conveyor between the chutes and the gate, and a third order being delivered onto the conveyor. Although the punched card corresponding to the second order has been removed, when the first order has passed through the gate the relay Y, Z, Q which was previously conditioned by the second card will now become effective.

It will be appreciated that the apparatus may be built up in this way to include any number of uniselectors. Moreover, the apparatus can readily be adapted to an increase in the number of possible stations by increasing the number of solenoids such as 61, 62. In this case more complex gate means may be required, using more than one gate.

This part of the apparatus can also be used in the modified form of the apparatus shown in FIGURE 3, where in place of a punched card the required order is set up in code form by manually operable switches. In this case additional switches are included to determine the station to which each order is to be delivered.

Having thus described my invention what I claim as new and desire to secure by Letters Patent is:

1. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means which can be set to determine the number of packages from each chute to be delivered onto the conveyor to constitute one order, means for detecting the passage of an order through the gate means and thereafter permitting re-setting of the gate means, means operable directly by said switch means for energising the gate-operating solenoids, so that the switch means must not be re-set for the delivery of a third order until the first order has passed through the gate means and the gate means has been re-set as determined by the setting of the switch means for the second order.

2. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means which can be set to determine the number of packages from each chute to be delivered onto the conveyor to constitute one order, means for detecting the passage of an order through the gate means and thereafter permitting re-setting of the gate means, means operable by the setting of said switch means for an order for indicating the required destination of said order and a cyclically operable memory unit for storing information indicating said required destination, said memory unit energising the gate operating solenoids successively in accordance with said stored information each time a complete order passes through the gate means.

3. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means which can be set to determine the number of packages from each chute to be delivered onto the conveyor to constitute one order, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means, a plurality of uniselectors operable successively to count the number of packages in successive orders delivered to the conveyor, the number of uniselectors being determined by the number of different orders it is required to have on the conveyor at any one time, a further uniselector for counting the number of packages in an order passing through the gate means, and means operable when the readings of said further uniselector and the appropriate uniselector in the plurality of uniselectors are equal for re-setting the uniselectors and permitting re-setting of the gate means by said memory unit.

4. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, said normally closed switches being opened when a punched card is inserted into said reader except at positions where a hole is punched in the card, and said switches determining the number of packages from each chute to be delivered onto the conveyor to constitute one order, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

5. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally open switches which can be closed manually, said switches determining the number of packages from each chute to be delivered onto the conveyor to constitute one order, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

6. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, a punched card having a plurality of sections corresponding to the plurality of chutes respectively, the positions of holes punched in said sections determining which switches of the punched card reader remain closed when the card is inserted in the reader and thereby determining the number of packages from each chute to be delivered to the conveyor to constitute a single order, a first uniselector, driving means for operating the uniselector intermittently to scan the plurality of sections of the punched card successively, means operable when a hole appears in the section being scanned for stopping the driving means, means operable upon stopping of the driving means for delivering from the chute corresponding to said section a number of packages dependent on the position of the hole in said section, means operable upon delivery of said number of packages for recommencing operation of the driving means, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

7. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, a punched card having a plurality of sections corresponding to the plurality of chutes respectively, the positions of holes punched in said sections determining which switches of the punched card reader remain closed when the card is inserted in the reader and thereby determining the number of packages from each chute to be delivered to the conveyor to constitute a single order, a first uniselector, driving means for operating the uniselector intermittently to scan the plurality of sections of the punched card successively, means operable when a hole appears in the section being scanned for stopping the driving means, a plurality of release means within the chutes respectively, a plurality of solenoids for operating the plurality of release means respectively to permit the delivery of packages from the chutes, means operable upon the release of a package from a chute to de-energise the solenoide associated with that chute, so that a single package is delivered each time a solenoid is energised, means operable upon stopping of the driving means for energising the solenoid corresponding to said section a number of times dependent on the number of packages required from said section as indicated by the position of the hole in said section, means operable upon delivery of said number of packages for recommencing operation of the driving means, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

8. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, a punched card having a plurality of sections corresponding to the plurality of chutes respectively, the positions of holes punched in said sections determining which switches of the punched card reader remain closed when the card is inserted in the reader and thereby determining the number of packages from each chute to be delivered to the conveyor to constitute a single order, a first uniselector, driving means for operating the uniselector intermittently to scan the plurality of sections of the punched card successively, said driving means including a second uniselector which traverses a plurality of contact pieces and at the end of each cycle stops the first uniselector once so that the next section of the punched card is scanned, said second uniselector being stepped at predetermined intervals unless a hole is punched in the section of the punched card being scanned, means whereby the presence of a hole indicating a requirement of *i* packages stops the second uniselector when it contacts each of the last *i* of its contact pieces, and steps the second uniselector onto the next contact piece only when a package has been delivered from the chute, means for detecting the passage of an order through the gate means and thereafter permitting resetting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

9. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, a punched card having a plurality of sections corresponding to the plurality of chutes respectively, the positions of holes punched in said sections determining which switches of the punched card reader remain closed when the card is inserted in the reader and thereby determining the number of packages from each chute to be delivered to the conveyor to constitute a single order, a first uniselector, driving means for operating the uniselector intermittently to scan the plurality of sections of the punched card successively, means operable when a hole appears in the section being scanned for stopping the driving means, means operable upon stopping of the driving means for delivering from the chute corresponding to said section a number of packages dependent on the position of the hole in said section, means operable upon delivery of said number of packages for recommencing operation of the driving means, means for stopping operation of the apparatus when a chute is emptied before the required number of packages has been delivered from the chute, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

10. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, a punched card having a plurality of sections corresponding to the plurality of chutes respectively, the positions of holes punched in said sections determining which switches of the punched card reader remain closed when the card is inserted in the reader and thereby determining the number of packages from each chute to be delivered to the conveyor to constitute a single order, a first uniselector, driving means for operating the uniselector intermittently to scan the plurality of sections of the punched card successively, means operable when a hole appears in the section being scanned for stopping the driving means, means operable upon stopping of the driving means for delivering from the chute corresponding to said section a number of packages dependent on the position of the hole in said section, means operable upon delivery of said number of packages for recommencing operation of the driving means, means for stopping operation of the apparatus when a chute is emptied before the required number of packages has been delivered from the chute, manually operable means for simulating the effect of a delivery of a package from a chute, thereby permitting re-starting of the apparatus, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

11. Apparatus for delivering to a predetermined station an order consisting of predetermined numbers of packages, comprising in combination a plurality of chutes for containing packages of different goods respectively, a conveyor to which the packages are delivered from the chutes, gate means in the path of movement of packages on the conveyor, gate operating solenoids for setting the gate means to any of a plurality of positions in which the packages on the conveyor are delivered to a plurality of stations respectively, switch means comprising a plurality of normally closed switches of a punched card reader, a punched card having a plurality of sections corresponding to the plurality of chutes respectively, the positions of holes punched in said sections determining which switches of the punched card reader remain closed when the card is inserted in the reader and thereby determining the number of packages from each chute to be delivered to the conveyor to constitute a single order, a first uniselector, driving means for operating the uniselector intermittently to scan the plurality of sections of the punched card successively, means operable when a hole appears in the section being scanned for stopping the driving means, means operable upon stopping of the driving means for delivering from the chute corresponding to said section a number of packages dependent on the position of the hole in said section, means operable upon delivery of said number of packages for recommencing operation of the driving means, means for stopping operation of the apparatus when a chute is emptied before the required number of packages has been delivered from the chute, manually operable means for simulating the effect of a delivery of a package from a chute, thereby permitting re-starting of the apparatus, means for by-passing the empty chute in subsequent operations of the apparatus, means for detecting the passage of an order through the gate means and thereafter permitting re-setting of the gate means, means operable by the setting of said switch means for an order for indicating the required destination of said order, and a cyclically operable memory unit for storing information indicating said required destination, said memory unit energising the gate operating solenoids successively in accordance with said stored information each time a complete order passes through the gate means.

12. Apparatus as claimed in claim 4 in which there are $n$ chutes and the punched card has $n$ sections corresponding to the $n$ chutes respectively, there being $m$ different positions in which a hole can be punched in a section to obtain delivery of up to $m$ packages, the apparatus further including $n$ release means within the chutes respectively, $n$ solenoids adapted when energised to permit the delivery of packages from the chutes respectively, means operable upon the delivery of a package from a chute for de-energising the solenoid associated with said chute, so that each energisation of a solenoid permits the delivery of a single package, a first uniselector including $m$ arms 1, 2 . . . $(m-1)$, $m$, said arms corresponding to the number of packages that can be delivered from a chute and being movable over $m$ banks of contact pieces each including $(n+1)$ contact pieces 0, 1, . . . $(n-1)$, $n$, the contact pieces 1, 2 . . . $(n-1)$, $n$ corresponding to the $n$ chutes respectively, the contact pieces 1, 2 . . . $(n-1)$, $n$, in the $m$ banks being adapted for connection to one terminal of a D.C. source, through the punched card reader, which ensures that when a punched card is inserted in the reader a contact piece will only be connected to the supply if a hole is punched in the appropriate position in the card, a second uniselector including an arm movable over a bank of $(m+1)$ contact pieces 0, 1, . . . $(m-1)$, $m$, the contact pieces 1, 2 . . . $(m-1)$, $m$ being connected respectively to the arms $m$ $(m-1)$ . . . 2, 1 of the first uniselector, first relay means through which the arm of the second uniselector is adapted for connection to the other terminal of the D.C. source, second relay means operable upon energisation of the first relay means through the first and second uniselectors for energising the solenoid corresponding to the contact piece in the first uniselector through which the second uniselector is energised, hold-on means which once the second relay means has been energised re-energises said solenoid each time the arm of the second uniselector is stepped onto a further contact piece, the hold-on means being effective until the arm of the second uniselector has been stepped out of contact with its contact piece $m$, means for driving the second uniselector step by step at predetermined intervals, means for delaying driving of the second uniselector when the second relay means is energised until a package has been delivered, and means operable upon completion of each cycle of operation of the second uniselector for driving the first uniselector one step, the arrangement being such that when a punched card indicates that a number $i$ of packages are required from a chute which can be termed the $j$th chute where $j$ can be any number from 1 to $n$, then the uniselectors will be stepped until the arms of the first uniselector contact the $j$th contact pieces respectively and the arm of the second uniselector contacts its $(m-1)$th contact piece, at which point a package will be delivered from the $j$th chute, the hold-on means being effective to cause a package to be delivered when the arm of the second uniselector contacts the remaining $(i-1)$ contact pieces in its cycle, so that a total of $i$ packages is delivered from the $j$th chute.

References Cited in the file of this patent
UNITED STATES PATENTS

| | | |
|---|---|---|
| 2,374,537 | Goldsmith | Apr. 24, 1945 |
| 2,672,289 | Skillman | Mar. 16, 1954 |
| 2,679,354 | Skillman | May 25, 1954 |